United States Patent
Yamate (10) Patent No.: US 9,255,210 B2
(45) Date of Patent: Feb. 9, 2016

(54) OLEFIN BASED POLYMER-COMBINED ORGANIC-INORGANIC COMPOSITE AND COMPOSITION FOR FORMING SAME

(71) Applicant: Nippon Soda Co., Ltd., Tokyo (JP)

(72) Inventor: Taiki Yamate, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 14/380,883

(22) PCT Filed: Feb. 27, 2013

(86) PCT No.: PCT/JP2013/001178
§ 371 (c)(1),
(2) Date: Aug. 25, 2014

(87) PCT Pub. No.: WO2013/128918
PCT Pub. Date: Sep. 6, 2013

(65) Prior Publication Data
US 2015/0045472 A1 Feb. 12, 2015

(30) Foreign Application Priority Data

Mar. 2, 2012 (JP) .................................. 2012-046143

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 147/00* | (2006.01) | |
| *C09D 123/00* | (2006.01) | |
| *C08L 23/00* | (2006.01) | |
| *C08K 5/5419* | (2006.01) | |

(52) U.S. Cl.
CPC ............... *C09D 147/00* (2013.01); *C08L 23/00* (2013.01); *C09D 123/00* (2013.01); *C08K 5/5419* (2013.01)

(58) Field of Classification Search
CPC .... C09D 147/00; C09D 123/00; C08L 23/00; C08K 5/5419
USPC .............. 522/39, 33, 6, 1, 71, 189, 184; 520/1
See application file for complete search history.

(56) References Cited

U.S. PATENT DOCUMENTS

| 3,655,598 A | 4/1972 | Antonen et al. | |
|---|---|---|---|
| 2010/0036012 A1* | 2/2010 | Kimura et al. | 522/172 |

FOREIGN PATENT DOCUMENTS

| DE | 1520548 | 2/1970 |
|---|---|---|
| GB | 985614 | 3/1965 |
| JP | 47-1389 | 1/1972 |
| JP | 5413548 | 2/1979 |
| JP | 60199072 | * 10/1985 |
| JP | 6143665 | * 3/1986 |
| JP | 10195417 | 7/1998 |
| JP | 2000-169755 | 6/2000 |
| JP | 2000-336281 | 12/2000 |
| JP | 2002-363494 | 12/2002 |
| WO | 2006/088079 | 8/2006 |
| WO | 2007/020806 | 2/2007 |
| WO | 2008/069217 | 6/2008 |
| WO | 2011/047220 | 4/2011 |
| WO | 2012/017660 | 2/2012 |

OTHER PUBLICATIONS

Noriyoshi et al , JP 61099072 Machine translation, Oct. 8, 1985.*
Noriyoshi et al, JP 6143665 Machine translation, Mar. 3, 1986.*
International Preliminary Report on Patentability issued for PCT/JP2013/001178, dated Sep. 12, 2014, 6 sheets.
International Search Report dated May 21, 2013, issued in corresponding PCT Application No. PCT/JP2013/001178, 4 pages (with English Translation).
TW Office Action issued in TW Application No. 102107358, dated Jun. 12, 2014, 5 pages (without English Translation).
EP Communication with a Supplementary European Search Report dated Oct. 9, 2015, issued in corresponding EP Application No. 13755254.3, 5 pages.

* cited by examiner

*Primary Examiner* — Ling Choi
*Assistant Examiner* — Jessica E Whiteley
(74) *Attorney, Agent, or Firm* — Kenyon & Kenyon, LLP (57) ABSTRACT

It is an object of the present invention to provide an anchor coating agent that can be used in one layer as an anchor coating for a base material and an inorganic material. An organic-inorganic hybrid coating composition that can be used as the anchor coating agent of the present invention contains the following components. a) an organic silicon compound which is at least one represented by formula (I) $R_nSiX_{4-n}$ ... (I) (wherein R represents an organic group having a carbon atom directly bonded to Si, and X represents a hydroxyl group or a hydrolyzable group; and n represents 1 or 2, wherein when n is 2, each R is the same or different, and when (4-n) is 2, each X is the same or different), wherein a solubility parameter of $R_n$ (SP1) obtained by Fedors' estimation method is smaller than a solubility parameter of an olefin-based polymer (SP2) obtained by Fedors' estimation method and a difference between the SP1 and the SP2 is 1.6 or more (Si1), and/or a condensate thereof; b) a photopolymerization initiator or a thermal polymerization initiator; and c) the olefin-based polymer.

6 Claims, 2 Drawing Sheets

OLEFIN BASED POLYMER-COMBINED ORGANIC-INORGANIC COMPOSITE AND COMPOSITION FOR FORMING SAME

TECHNICAL FIELD

The present invention relates to an organic-inorganic hybrid in which an olefin-based polymer is blended, and a composition for forming the same.

This application is a national stage application of International Application No. PCT/JP2013/001178, filed on Feb. 27, 2013, which claims priority to Japanese Patent Application No. 2012-46143, filed on Mar. 2, 2012, each of which is incorporated by reference in its entirety.

BACKGROUND ART

Currently, as a raw material of a commercial silane-based coating agent, a trifunctional silane is mainly used, and a polysiloxane having moderate hardness and flexibility is formed by such a trifunctional silane. However, the hard coating properties of a film of a trifunctional silane are not sufficient. Therefore, the trifunctional silane is mixed with a tetrafunctional silane and colloidal silica to compensate for the hard coating properties. But, a problem is that if the film is hardened, the film cracks easily, and the adhesiveness worsens.

Silane-based coating agents include antifouling layer coating materials containing a trifunctional alkoxysilane compound having an epoxy group (Patent Document 1). In addition, silane-based coating agents containing a photocatalyst are also proposed, and the layer is cured using a photo-acid-generating agent, a crosslinking agent, a curing catalyst, or the like (for example, Patent Documents 2 and 3). Further, silane-based organic-inorganic hybrid gradient materials having a component gradient structure in which the content of the metal-based compound in the material changes continuously in the depth direction from the surface of the material are also proposed (for example, Patent Document 4).

The present inventors have provided an organic-inorganic hybrid in which the surface has very high hardness and the inside and the back surface side have appropriate hardness and which has excellent adhesiveness to a substrate, by irradiating an organic silicon compound with ultraviolet rays in the presence of a photosensitive compound (Patent Document 5). The present inventors have further provided an organic-inorganic hybrid in which the surface has very high hardness and which has excellent adhesiveness to a substrate and excellent moisture resistance, by blending an acrylate-based resin that is an ultraviolet-curable resin into a polysiloxane-based organic-inorganic complex (Patent Document 6).

On the other hand, an olefin base material, such as a cycloolefin base material, a PP base material, or a PE base material, has poor adhesiveness to an inorganic material, and therefore, in order to achieve good adhesiveness, an anchor coating (base film) is required between the inorganic material and the olefin base material. Currently, the anchor coating is insufficient in one layer, and a three-layer structure of (A) a layer having good adhesiveness to an olefin base material/(B) a layer having good adhesiveness to both A and C/(C) a layer having good adhesiveness to an inorganic material is required. However, by increasing the number of layers, sophisticated lamination technique is required, and the production cost also increases. Particularly, there is a problem of decreasing good optical properties, an advantage of a cycloolefin base material. Therefore, an anchor coating agent that can be used in one layer as an anchor coating for an olefin base material and an inorganic material has been studied, but even the organic-inorganic hybrid layers described in the above Patent Literatures 5 and 6 have been insufficient.

PRIOR ART DOCUMENTS

Patent Documents

Patent Document 1: Japanese unexamined Patent Application Publication No. 10-195417
Patent Document 2: Japanese unexamined Patent Application Publication No. 2002-363494
Patent Document 3: Japanese unexamined Patent Application Publication No. 2000-169755
Patent Document 4: Japanese unexamined Patent Application Publication No. 2000-336281
Patent Document 5: WO2006/088079
Patent Document 6: WO2008/069217

SUMMARY OF THE INVENTION

Object to be Solved by the Invention

It is an object of the present invention to provide an anchor coating agent having excellent adhesiveness that can be used in one layer as an anchor coating for a base material and an inorganic materials, and particularly to provide an anchor coating agent having excellent adhesiveness to an olefin base material.

Means to Solve the Object

The present inventors have addressed the above object and studied diligently, and, as a result, found that by blending an olefin-based polymer into a polysiloxane-based organic-inorganic hybrid, it can be used in one layer as an anchor coating between an olefin base material and an inorganic material, leading to the completion of the present invention.

Specifically, the present invention relates to
(1) an organic-inorganic hybrid coating composition comprising:
a) a condensate of an organic silicon compound which is at least one represented by formula (I):

$$R_nSiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different), wherein a solubility parameter of $R_n$ (SP1) obtained by Fedors' estimation method is smaller than a solubility parameter of an olefin-based polymer (SP2) obtained by Fedors' estimation method and a difference between the SP1 and the SP2 is 1.6 or more (Si1);
b) a photopolymerization initiator or a thermal polymerization initiator; and
c) the olefin-based polymer, and
(2) an organic-inorganic hybrid coating composition comprising:
a) a condensate of an organic silicon compound which is at least one represented by formula (I):

$$R_nSiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different), wherein a molar ratio (Si1:Si2) of an organic silicon compound in which a solubility parameter of $R_n$ (SP1) obtained by Fedors' estimation method is smaller than a solubility parameter of an olefin-based polymer (SP2) obtained by Fedors' estimation method and a difference between the SP1 and the SP2 is 1.6 or more (Si1) to an organic silicon compound in which SP1 is smaller than SP2 and a difference between the SP1 and the SP2 is less than 1.6 or an organic silicon compound in which SP1 is larger than SP2 (Si2) is 5:5 to 10:0;
b) a photopolymerization initiator or a thermal polymerization initiator; and
c) the olefin-based polymer. In addition, the present invention relates to
(3) an organic-inorganic hybrid comprising:
a) a condensate of an organic silicon compound which is at least one represented by formula (I):

$$R_nSiX_{4-n} \tag{I}$$

(wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different), wherein a solubility parameter of $R_n$ (SP1) obtained by Fedors' estimation method is smaller than a solubility parameter of an olefin-based polymer (SP2) obtained by Fedors' estimation method and a difference between the SP1 and the SP2 is 1.6 or more (Si1);
b) a photopolymerization initiator or a thermal polymerization initiator; and
c) a cured product of the olefin-based polymer, and
(4) an organic-inorganic hybrid comprising:
a) a condensate of an organic silicon compound which is at least one represented by formula (I):

$$R_nSiX_{4-n} \tag{I}$$

(wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different), wherein a molar ratio (Si1:Si2) of an organic silicon compound in which a solubility parameter of $R_n$ (SP1) obtained by Fedors' estimation method is smaller than a solubility parameter of an olefin-based polymer (SP2) obtained by Fedors' estimation method and a difference between the SP1 and the SP2 is 1.6 or more (Si1) to an organic silicon compound in which SP1 is smaller than SP2 and a difference between the SP1 and the SP2 is less than 1.6 or an organic silicon compound in which SP1 is larger than SP2 (Si2) is 5:5 to 10:0;
b) a photopolymerization initiator or a thermal polymerization initiator; and
c) a cured product of the olefin-based polymer.
Further, the present invention relates to
(5) a laminate obtained by applying an organic-inorganic hybrid coating composition according to the above (1) or (2) to a base material.

Effect of the Invention

By using as an organic silicon compound an organic silicon compound in which the solubility parameter of $R_n$ (SP1) obtained by Fedors' estimation method is smaller than the solubility parameter of an olefin-based polymer (SP2) obtained by Fedors' estimation method and the difference between the SP1 and the SP2 is 1.6 or more, and using as an anchor coating agent an organic-inorganic hybrid coating composition in which a polyolefin-based polymer is blended, an olefin base material and an inorganic material can be laminated with one anchor coating layer.

MODE OF CARRYING OUT THE INVENTION (Organic-Inorganic Hybrid Coating Composition)
The organic-inorganic hybrid coating composition of the present invention comprises:
a) a condensate of an organic silicon compound which is at least one represented by formula (I):

$$R_nSiX_{4-n} \tag{I}$$

(wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different), wherein the solubility parameter of $R_n$ (SP1) obtained by Fedors' estimation method is smaller than the solubility parameter of an olefin-based polymer (SP2) obtained by Fedors' estimation method and the difference between the SP1 and the SP2 is 1.6 or more (Si1) (hereinafter sometimes simply referred to as an organic silicon compound);
b) a photopolymerization initiator or a thermal polymerization initiator; and
c) the olefin-based polymer.
The organic-inorganic hybrid coating composition of the present invention usually contains water and/or other solvents other than the above components.
The solids (the organic silicon component, the olefin-based polymer, and the like) in the organic-inorganic hybrid coating composition of the present invention are preferably 1 to 75% by mass, more preferably 10 to 60% by mass.
(Organic Silicon Compound)
In the formula (I) of the organic silicon compound of the present invention, R and X are each as follows.
R represents an organic group having a carbon atom directly bonded to Si. Examples of such an organic group can include hydrocarbon groups which may be substituted, and groups consisting of polymers of hydrocarbons which may be substituted. Specific examples include hydrocarbon groups having 1 to 30 carbon atoms which may be substituted. Straight chain or branched chain alkyl groups having 1 to 30, preferably 1 to 10, carbon atoms which may be substituted, cycloalkyl groups having 3 to 8 carbon atoms which may be substituted, straight chain or branched chain alkenyl groups having 2 to 10 carbon atoms which may be substituted, or cycloalkenyl groups having 3 to 8 carbon atoms which may be substituted are preferred. In addition, the organic group may be a hydrocarbon group having an aromatic ring.

In addition, such an organic group may comprise an oxygen atom, a nitrogen atom, or a silicon atom, and may be a group comprising a polymer such as a polysiloxane, a polyvinylsilane, or a polyacrylsilane. Examples of the substituent of "which may be substituted" can include halogen atom and a methacryloxy group. Examples of the halogen atom include a fluorine atom, a chlorine atom, a bromine atom, and an iodine atom.

Examples of "alkyl groups having 1 to 30 carbon atoms" include a methyl group, an ethyl group, a n-propyl group, an isopropyl group, a n-butyl group, an isobutyl group, a s-butyl group, a t-butyl group, a n-pentyl group, an isopentyl group, a neopentyl group, a 2-methylbutyl group, a 2,2-dimethylpropyl group, a n-hexyl group, an isohexyl group, a n-heptyl group, a n-octyl group, a nonyl group, an isononyl group, a decyl group, a lauryl group, a tridecyl group, a myristyl group, a pentadecyl group, a palmityl group, a heptadecyl group, a stearyl group, and an icosyl group.

Examples of "the cycloalkyl groups having 3 to 8 carbon atoms" include a cyclopropyl group, a cyclobutyl group, a cyclopentyl group, a cyclohexyl group, a cycloheptyl group, and a cyclooctyl group.

"The straight chain or branched chain alkenyl groups having 2 to 10 carbon atoms" mean straight chain or branched chain alkenyl groups having 2 to 10 carbon atoms that have a carbon-carbon double bond at any one or more sites. Examples of the straight chain or branched chain alkenyl groups having 2 to 10 carbon atoms include an ethenyl group, a prop-1-ene-1-yl group, a prop-2-ene-1-yl group, a prop-1-ene-2-yl group, a but-1-ene-1-yl group, a but-2-ene-1-yl group, a but-3-ene-1-yl group, a but-1-ene-2-yl group, a but-3-ene-2-yl group, a pent-1-ene-1-yl group, a pent-4-ene-1-yl group, a pent-1-ene-2-yl group, a pent-4-ene-2-yl group, a 3-methyl-but-1-ene-1-yl group, a hex-1-ene-1-yl group, a hex-5-ene-1-yl group, a hept-1-ene-1-yl group, a kept-6-ene-1-yl group, an oct-1-ene-1-yl group, an oct-7-ene-1-yl group, and a but-1,3-diene-1-yl group.

"The cycloalkenyl groups having 3 to 8 carbon atoms" mean alkenyl groups having 3 to 8 carbon atoms that have a carbon-carbon double bond at any one or more sites and have a cyclic moiety. Examples of the cycloalkenyl groups having 3 to 8 carbon atoms include a 1-cyclopenten-1-yl group, a 2-cyclopenten-1-yl group, a 1-cyclohexen-1-yl group, a 2-cyclohexen-1-yl group, and a 3-cyclohexen-1-yl group.

Examples of "the hydrocarbon groups having an aromatic ring" include $C_{6-10}$ aryl group, $C_{6-10}$ aryl $C_{1-8}$ alkyl groups, and $C_{6-10}$ aryl $C_{2-6}$ alkenyl groups.

Examples of "the $C_{6-10}$ aryl groups" include a phenyl group and a naphthyl group.

Examples of "the $C_{6-10}$ aryl $C_{1-8}$ alkyl groups" include a benzyl group, a phenethyl group, a 3-phenyl-n-propyl group, a 4-phenyl-n-butyl group, a 5-phenyl-n-pentyl group, a 8-phenyl-n-octyl group, and a naphthylmethyl group.

Examples of "the $C_{6-10}$ aryl $C_{2-6}$ alkenyl groups" include a styryl group, a 3-phenyl-prop-1-ene-1-yl group, a 3-phenyl-prop-2-ene-1-yl group, a 4-phenyl-but-1-ene-1-yl group, a 4-phenyl-but-3-ene-1-yl group, a 5-phenyl-pent-1-ene-1-yl group, a 5-phenyl-pent-4-ene-1-yl group, a 8-phenyl-oct-1-ene-1-yl group, a 8-phenyl-oct-7-ene-1-yl group, and a naphthylethenyl group.

Examples of "the groups having an oxygen atom" include an alkoxyalkyl group; groups having an oxirane ring (epoxy group), such as an epoxy group, epoxyalkyl groups, and a glycidoxypropyl group; an acryloxymethyl group, and a methacryloxymethyl group.

The "alkoxyalkyl groups" are usually C1-6 alkoxy C1-6 alkyl groups. Examples of the "alkoxyalkyl groups" include a methoxymethyl group, a 2-methoxyethyl group, and a 3-ethoxy-n-propyl group.

As the "epoxyalkyl groups," straight chain or branched chain epoxyalkyl groups having 3 to 10 carbon atoms are preferred. Examples of the epoxyalkyl groups include linear alkyl groups comprising an epoxy group, such as a glycidyl group, a glycidylmethyl group, a 2-glycidylethyl group, a 3-glycidylpropyl group, a 4-glycidylbutyl group, a 3,4-epoxybutyl group, a 4,5-epoxypentyl group, and a 5,6-epoxyhexyl group; and branched alkyl groups comprising an epoxy group, such as a β-methylglycidyl group, a β-ethylglycidyl group, a β-propylglycidyl group, a 2-glycidylpropyl group, a 2-glycidylbutyl group, a 3-glycidylbutyl group, a 2-methyl-3-glycidylpropyl group, a 3-methyl-2-glycidylpropyl group, a 3-methyl-3,4-epoxybutyl group, a 3-ethyl-3,4-epoxybutyl group, a 4-methyl-4,5-epoxypentyl group, and a 5-methyl-5,6-epoxyhexyl group.

Examples of "glycidoxyalkyl groups" include a glycidoxymethyl group and a glycidoxypropyl group.

As "the groups having a nitrogen atom", groups having —NR'$_2$ (wherein R' represents a hydrogen atom, an alkyl group, or an aryl group, and R' is the same as or different from each other) or groups having —N=CR''$_2$ (wherein R'' represents a hydrogen atom or an alkyl group, and R'' is the same as or different from each other) are preferred. Examples of the alkyl group include the same ones as the above. Examples of the aryl group include a phenyl group, a naphthyl group, an anthracen-1-yl group, and a phenanthren-1-yl group.

Examples of "the groups having —NR'$_2$" include a —CH$_2$—NH$_2$ group, a —C$_3$H$_6$—NH$_2$ group, and a —CH$_2$—NH—CH$_3$ group. Examples of "the groups having —N=CR''$_2$" include a —CH$_2$—N=CH—CH$_3$ group, a —CH$_2$—N=C(CH$_3$)$_2$ group, and a —C$_2$H$_4$—N=CH—CH$_3$ group.

Among the above, examples of groups decomposed by irradiation with light having a wavelength of 350 nm or less include groups having a vinyl group, groups having an oxirane ring, groups having —NR'$_2$ (wherein R' represents a hydrogen atom, an alkyl group, or an aryl group, and R' is the same as or different from each other), or groups having —N=CR''$_2$ (wherein R'' represents a hydrogen atom or an alkyl group, and R'' is the same as or different from each other).

Here, examples of the groups having a vinyl group include groups having groups having alkenyl groups, such as an ethenyl group (vinyl group), a prop-2-ene-1-yl group, a but-3-ene-1-yl group, a pent-4-ene-1-yl group, a hex-5-ene-1-yl group, a kept-6-ene-1-yl group, and an oct-7-ene-1-yl group, vinylcarbonyl groups, such as a methacrylmethyl group, an acryloxymethyl group, and a methacryloxymethyl group, or the like. The groups having an oxirane ring, the groups having —NR'$_2$, and the groups having —N=CR''$_2$ are as described above.

In addition, in the formula (I) of the organic silicon compound, n represents 1 or 2, and n=1 is particularly preferred. When n is 2, each R is the same or different. In addition, one of these can be used alone, or two or more of these can be used in combination.

X represents a hydroxyl group or a hydrolyzable group. When (4-n) in formula (I) is 2 or more, each X is the same or different. The hydrolyzable group means, for example, a group that can be hydrolyzed by heating at 25° C. to 100° C. in the coexistence of excess water without a catalyst to produce a silanol group, or a group that can form a siloxane condensate. Specific examples of the hydrolyzable group can include alkoxy groups, acyloxy groups, halogen groups, and isocyanate groups. Alkoxy groups having 1 to 4 carbon atoms, or acyloxy groups having 1 to 6 carbon atoms are preferred.

Examples of the alkoxy groups having 1 to 4 carbon atoms include a methoxy group, an ethoxy group, a n-propoxy group, an isopropyloxy group, a n-butoxy group, an isobutoxy group, and a t-butoxy group. Examples of the acyloxy groups having 1 to 6 carbon atoms include an acetyloxy group and a benzoyloxy group. Examples of the halogen atom include a fluorine atom, a chlorine atom, a bromine atom, and an iodine atom.

In addition, examples of the organic silicon compounds having a group consisting of a polymer of a hydrocarbon can include (meth)acrylates, such as methyl(meth)acrylate, ethyl (meth)acrylate, butyl(meth)acrylate, 2-ethylhexyl(meth) acrylate, and cyclohexyl(meth)acrylate; carboxylic acids, such as (meth)acrylic acid, itaconic acid, and fumaric acid, and acid anhydrides, such as maleic anhydride; epoxy compounds, such as glycidyl(meth)acrylate; amino compounds, such as diethylaminoethyl(meth)acrylate and aminoethyl vinyl ether; amide compounds, such as (meth)acrylamide, itaconic acid diamide, α-ethylacrylamide, crotonamide, fumaric acid diamide, maleic acid diamide, and N-butoxymethyl(meth)acrylamide; and organic silicon compounds comprising as the R component in formula (I) a vinyl-based polymer obtained by copolymerizing a vinyl-based compound selected from acrylonitrile, styrene, α-methylstyrene, vinyl chloride, vinyl acetate, vinyl propionate, and the like.

The organic silicon compound used in the present invention is an organic silicon compound in which the solubility parameter of $R_n$ (SP1) obtained by Fedors' estimation method is smaller than the solubility parameter of an olefin-based polymer (SP2) obtained by Fedors' estimation method and the difference between the SP1 and the SP2 is 1.6 or more (Si1).

The organic silicon compound used in the present invention may further comprise an organic silicon compound in which SP1 is smaller than SP2 and the difference between the SP1 and the SP2 is less than 1.6 or an organic silicon compound in which SP1 is larger than SP2 (Si2). When Si2 is included, (Si1:Si2) is 5:5 to 10:0, preferably 9:1 to 10:0.

Here, the solubility parameter (SP value) is calculated based on the following Fedors' estimation method.

Fedors' formula: SP value$(\delta) = (E_v/v)^{1/2} = (\Sigma \Delta e_i / \Sigma \Delta v_i)^{1/2}$ $E_v$: evaporation energy
v: molar volume
$\Delta e_i$: the evaporation energy of an atom or atomic group of each component
$\Delta v_i$: the molar volume of each atom or atomic group For the evaporation energy and molar volume of each atom or atomic group used in the calculation of the above formula, R. F. Fedors, Polym. Eng. Sci., 14, 147 (1974) can be referred to.

Therefore, the organic silicon compound used in the present invention is different according to the type of the olefin-based polymer used in the present invention. The solubility parameters (SP values) of the $R_n$ of organic silicon compounds and olefin-based polymers can be calculated based on Fedors' estimation method, and therefore, the combination of the organic silicon compound and the olefin-based polymer can be determined based on previously calculated SP values.

For example, when polybutadiene (SP value: 8.5) is used as the olefin polymer, examples of organic silicon compounds having an SP value smaller than the SP value of the olefin-based polymer by 1.6 or more include methyltrichlorosilane, methyltrimethoxysilane, methyltriethoxysilane, methyltributoxysilane, ethyltrimethoxysilane, ethyltriisopropoxysilane, ethyltri(n-butoxy)silane, dimethyldichlorosilane, dimethyldimethoxysilane, dimethyldiaminosilane, and dimethyldiacetoxysilane (all of these have an SP value of 6.9 or less).

In addition, examples of organic silicon compounds having an SP value smaller than the SP value of the olefin-based polymer by less than 1.6, or organic silicon compounds having an SP value larger than the SP value of the olefin-based polymer include trifluoromethyltrimethoxysilane, vinyltrimethoxysilane, methyltri(meth)acryloxysilane, methyltris[2-(meth)acryloxyethoxy]silane, methyltriglycidyloxysilane, methyltris(3-methyl-3-oxetanemethoxy)silane, vinyltrichlorosilane, vinyltriethoxysilane, n-butyltrimethoxysilane, pentafluorophenyltrimethoxysilane, phenyltrimethoxysilane, nonafluoro-n-butylethyldimethoxysilane, diphenyldimethoxysilane, di-n-butyldimethoxysilane, 3-(meth)acryloxy-n-propyltrimethoxysilane, 3-(3-methyl-3-oxetanemethoxy)-n-propyltrimethoxysilane, oxacyclohexyltrimethoxysilane, 2-(3,4-epoxycyclohexyl)ethyltrimethoxysilane, 3-glycidyloxy-n-propyltrimethoxysilane, 3-glycidyloxy-n-propylmethyldiethoxysilane, 3-glycidyloxy-n-propyltriethoxysilane, p-styryltrimethoxysilane, 3-methacryloxy-n-propylmethyldimethoxysilane, 3-methacryloxy-n-propyltrimethoxysilane, 3-methacryloxy-n-propylmethyldiethoxysilane, 3-methacryloxy-n-propyltriethoxysilane, 3-acryloxy-n-propyltrimethoxysilane, N-(2-aminoethyl)-3-amino-n-propylmethyldimethoxysilane, N-(2-aminoethyl)-3-amino-n-propyltrimethoxysilane, N-(2-aminoethyl)-3-amino-n-propyltriethoxysilane, 3-amino-n-propyltrimethoxysilane, 3-amino-n-propyltriethoxysilane, 3-(N-1,3-dimethyl-butylidene)amino-n-propyltriethoxysilane, N-phenyl-3-amino-n-propyltrimethoxysilane, and organic silicon compounds having a group consisting of a polymer of a hydrocarbon (all of these have an SP value of larger than 6.9).

One of these can be used alone, or two or more of these can be used in combination.

The condensate of the organic silicon compound used in the present invention preferably has an average particle diameter of 50 nm or less, more preferably 20 nm or less.

The amount of the condensate of the organic silicon compound in the solids of the organic-inorganic hybrid coating composition of the present invention is 1 to 95% by mass, preferably 1 to 50% by mass, based on the total mass of the condensate of the organic silicon compound, the olefin-based polymer, and other components added as required.

(Silanol Condensation Catalyst)

The condensate of the organic silicon compound of the present invention can be obtained by subjecting the organic silicon compound of formula (I) to a condensation reaction using a silanol catalyst.

The silanol catalyst used in the condensation reaction of the above organic silicon compound may be contained in the organic-inorganic hybrid coating composition of the present invention.

The silanol condensation catalyst is not particularly limited as long as it hydrolyzes the hydrolyzable group in the compound represented by formula (I), and condenses the silanol to form a siloxane bond. Examples of the silanol condensation catalyst include at least one selected from the group consisting of organic metals, organic acid metal salts, metal chelate compounds, and hydrolysates thereof, and condensates thereof, acids, and bases. One silanol condensation catalyst can be used alone, or two or more silanol condensation catalysts can be used in combination.

Examples of the organic metals include alkyl metal compounds, such as tetramethyltitanium and tetrapropylzirconium, and metal alcoholates, such as tetraisopropoxytitanium and tetrabutoxyzirconium.

Examples of the organic acid metal salts include metal carboxylates, metal sulfonates, and phenol metal salts.

Examples of the metal chelate compounds include metal chelate compounds with β-ketocarbonyl compounds, β-ketoester compounds, α-hydroxyester compounds, or the like.

Examples of the acids include organic acids and mineral acids. Specific examples of the organic acids include acetic acid, formic acid, oxalic acid, carbonic acid, phthalic acid, trifluoroacetic acid, p-toluenesulfonic acid, and methanesulfonic acid. Specific examples of the mineral acids include hydrochloric acid, nitric acid, boric acid, and hydrofluoboric acid.

Here, the acids encompass photo-acid-generating agents that generate an acid by light irradiation, specifically, diphenyliodonium hexafluorophosphate, triphenylphosphonium hexafluorophosphate, and the like.

Examples of the bases include strong bases, such as tetramethylguanidine and tetramethylguanidylpropyltrimethoxysilane; organic amines, carboxylic acid-neutralized salts of organic amines, and quaternary ammonium salts.

Among these, particularly, photosensitive compounds that can remove the carbon component on the surface side by the action of light having a wavelength of 350 nm or less are preferred.

The photosensitive compounds are compounds that can remove the carbon component on the surface side by the action of light having a wavelength of 350 nm or less, irradiated from the surface side, regardless of their mechanisms, preferably, compounds that can set the carbon content of a surface portion at 2 nm from the surface in the depth direction to 80% or less, more preferably 2 to 60%, and further preferably 2 to 40%, of the carbon content of a portion in which the amount of carbon does not decrease (in the case of a film, for example, a back surface portion at 10 nm from the back surface of the film in the depth direction). The photosensitive compounds particularly preferably refer to compounds that can remove the carbon component to a predetermined depth so that the amount of the carbon component removed decreases gradually from the surface side, that is, compounds that can form a layer in which the carbon content increases gradually from the surface to a predetermined depth. Specific examples of the photosensitive compounds can include compounds that absorb light having a wavelength of 350 nm or less and are excited.

Here, the light having a wavelength of 350 nm or less means light obtained using a source of light comprising light having any wavelength of 350 nm or less as a component, preferably, light obtained using a source of light comprising light having any wavelength of 350 nm or less as the main component, that is, light obtained using a source of light in which the wavelength of a component in the largest amount is 350 nm or less.

The photosensitive compound is preferably at least one compound selected from the group consisting of metal chelate compounds, organic acid metal salts, metal compounds having two or more hydroxyl groups or hydrolyzable groups (excluding metal chelate compounds and organic acid metal salts), hydrolysates thereof, and condensates thereof, particularly preferably a hydrolysate and/or a condensate, and especially preferably a hydrolysate and/or condensate of a metal chelate compound. Such a photosensitive compound and/or a derivative thereof may be chemically bonded to the organic silicon compound, may be dispersed in a non-bonded state, or may be in a mixed state thereof.

For the derivative of the photosensitive compound, specifically, hydrolysates or condensates of hydrolysates of metal chelate compounds, organic acid metal salts, or metal compounds having two or more hydroxyl groups or hydrolyzable groups or condensates thereof, or the like can be illustrated.

The above metal chelate compounds are preferably metal chelate compounds having a hydroxyl group or a hydrolyzable group, more preferably metal chelate compounds having two or more hydroxyl groups or hydrolyzable groups. Having two or more hydroxyl groups or hydrolyzable groups means that the total of hydrolyzable groups and hydroxyl groups is 2 or more. In addition, as the above metal chelate compounds, β-ketocarbonyl compounds, β-ketoester compounds, and α-hydroxyester compounds are preferred. Specific examples of the above metal chelate compounds include β-ketoesters, such as methyl acetoacetate, n-propyl acetoacetate, isopropyl acetoacetate, n-butyl acetoacetate, sec-butyl acetoacetate, and t-butyl acetoacetate; β-diketones, such as acetylacetone, hexane-2,4-dione, heptane-2,4-dione, heptane-3,5-dione, octane-2,4-dione, nonane-2,4-dione, and 5-methyl-hexane-2,4-dione; and compounds in which hydroxycarboxylic acids, such as glycolic acid and lactic acid, or the like are coordinated.

The above organic acid metal salts are salts obtained from metal ions and organic acids. Examples of the organic acids include organic compounds that exhibit acidity, such as carboxylic acids, such as acetic acid, oxalic acid, tartaric acid, and benzoic acid; sulfur-containing organic acids, such as sulfonic acid and sulfinic acid; phenol compounds; enol compounds; oxime compounds; imide compounds; and aromatic sulfonamides.

In addition, the above metal compounds having two or more hydroxyl groups or hydrolyzable groups are those other than the above metal chelate compounds and organic acid metal salts. Examples of the above metal compounds having two or more hydroxyl groups or hydrolyzable groups can include metal alcoholates, such as metal hydroxides, metal n-propoxides, metal isopropoxides, and metal n-butoxides.

Examples of the hydrolyzable groups in the above metal compounds having two or more hydroxyl groups or hydrolyzable groups, the above metal chelate compounds, or the above organic acid metal salts include alkoxy groups, acyloxy groups, halogen groups, and isocyanate groups. Alkoxy groups having 1 to 4 carbon atoms and acyloxy groups having 1 to 4 carbon atoms are preferred. Having two or more hydroxyl groups or hydrolyzable groups means that the total of hydrolyzable groups and hydroxyl groups is 2 or more.

The hydrolysate and/or condensate of a metal compound having two or more hydroxyl groups or hydrolyzable groups is preferably one obtained by hydrolyzing 1 mole of the metal compound having two or more hydroxyl groups or hydrolyzable groups, using 0.5 moles or more of water, more preferably one obtained by hydrolyzing 1 mole of the metal compound having two or more hydroxyl groups or hydrolyzable groups, using 0.5 to 2 moles of water.

In addition, the hydrolysate and/or condensate of the metal chelate compound is preferably one obtained by hydrolyzing 1 mole of the metal chelate compound using 5 to 100 moles of water, more preferably one obtained by hydrolyzing 1 mole of the metal chelate compound using 5 to 20 moles of water.

In addition, the hydrolysate and/or condensate of the organic acid metal salt is preferably one obtained by hydrolyzing 1 mole of the organic acid metal salt using 5 to 100 moles of water, more preferably one obtained by hydrolyzing 1 mole of the metal organic acid salt using 5 to 20 moles of water.

In the present invention, when two or more silanol condensation catalysts are used, the above compound having photosensitivity may or may not be contained. In addition, the compound having photosensitivity and a compound having no photosensitivity can be used in combination.

In addition, examples of metals in these metal compounds, metal chelate compounds, or organic acid metal salt compounds include titanium (Ti), zirconium (Zr), aluminum (Al), silicon (Si), germanium (Ge), indium (In), tin (Sn), tantalum (Ta), zinc (Zn), tungsten (W), and lead (Pb). Among these, titanium (Ti), zirconium (Zr), aluminum (Al), and tin (Sn) are preferred, and particularly, titanium (Ti) is preferred. One of these may be used alone, or two or more of these can also be used.

The silanol condensation catalyst, such as the metal chelate compounds, organic acid metal salts, metal compounds having two or more hydroxyl groups or hydrolyzable groups, used in the present invention is preferably a hydrolysate and/or a condensate, particularly preferably a hydrolysate and/or condensate of a metal chelate compound, and its average particle diameter is preferably 20 nm or less, more preferably 10 nm or less. Thus, the transparency of the organic-inorganic hybrid (organic-inorganic hybrid thin layer) can be improved.

The blending ratio of the silanol condensation catalyst used in the present invention is 1:99 to 99:1, preferably 1:99 to 50:50, based on the mass of the condensate of the organic silicon compound.
(Olefin-Based Polymer)

The olefin-based polymer of the present invention encompasses polymers of one or more olefins having 2 to 30 carbon atoms, and copolymers with other copolymerizable monomers.

In addition, one or both of the polymer ends may be modified with a carboxyl group, an acrylic group, maleic anhydride, a hydroxy group, an epoxy group, or the like.

The olefin-based polymer of the present invention should be one having a degree of polymerization of 2 or more, and the number average molecular weight Mn is preferably 50 to 100,000, more preferably 50 to 10,000.

Examples of the olefins having 2 to 30 carbon atoms include alkenes, such as ethylene, propylene, 1-butene, 2-butene, isobutene, 1-pentene, 1-octene, 1-decene, and 1-dodecene;
nonconjugated dienes, such as 1,4-pentadiene, 1,5-hexadiene, 1,7-octadiene, 1,9-decadiene, and 1,11-dodecadiene; and
conjugated dienes, such as 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene. Conjugated dienes are particularly preferred.

The other copolymerizable monomers include (meth) acrylic acid-based monomers and aromatic vinyl-based monomers, and the following are illustrated.

As the (meth)acrylic acid-based monomers, (meth)acrylic acid; (meth)acrylate compounds, such as methyl(meth)acrylate, ethyl(meth)acrylate, n-propyl(meth)acrylate, i-propyl(meth)acrylate, n-butyl(meth)acrylate, i-butyl(meth)acrylate, s-butyl(meth)acrylate, t-butyl(meth)acrylate, hexyl (meth)acrylate, glycidyl(meth)acrylate, cyclohexyl(meth) acrylate, 2-ethylhexyl(meth)acrylate, 1-ethylcyclohexyl (meth)acrylate, and benzyl(meth)acrylate; 2-methoxyethyl (meth)acrylate, methoxy polyethylene glycol (the number of ethylene glycol units is 2 to 100) (meth)acrylate, ethoxy polyethylene glycol (meth)acrylate, phenoxy polyethylene glycol (meth)acrylate, and the like can be illustrated. One of these can be used alone, or two or more of these can be mixed and used.

Examples of the aromatic vinyl-based monomers can include heteroaryl compounds, such as styrene, o-methylstyrene, p-methylstyrene, p-t-butylstyrene, α-methylstyrene, p-t-butoxystyrene, m-t-butoxystyrene, p-(1-ethoxyethoxy) styrene, 2,4-dimethylstyrene, vinylaniline, vinylbenzoic acid, vinylnaphthalene, vinylanthracene, 2-vinylpyridine, 4-vinylpyridine, 2-vinylquinoline, 4-vinylquinoline, 2-vinylthiophene, and 4-vinylthiophene. One of these can be used alone, or two or more of these can be mixed and used.

Here, the molar ratio of the olefin monomer to other copolymerizable monomers in the polymer is 100:0 to 50:50, preferably 100:0 to 70:30, and more preferably 100:0 to 80:20.

The amount of the olefin-based polymer in the solids of the organic-inorganic hybrid coating composition of the present invention is 2 to 99% by mass, preferably 50 to 99% by mass, more preferably 60 to 99% by mass, and further preferably 70 to 99% by mass, based on the total mass of the condensate of the organic silicon compound the olefin-based polymer, and other components blended as required.
(Polymerization Initiator for Olefin-Based Polymer)

Examples of the polymerization initiator for the olefin polymer include a photopolymerization initiator and a thermal polymerization initiator.

Photopolymerization Initiator:

Examples of the photopolymerization initiator of the present invention can include (a) compounds that generate a cationic species by light irradiation, and (b) compounds that generate an active radical species by light irradiation.

Preferred examples of the compounds that generate a cationic species by light irradiation can include onium salts having a structure represented by the following formula (II). The onium salts are compounds that release a Lewis acid by receiving light.

$$[R^1_a R^2_b R^3_c R^4_d W]^{+e}[ML_{e+f}]^{-e} \quad (II)$$

(wherein the cation represents an onium ion, W represents S, Se, Te, P, As, Sb, Bi, O, I, Br, Cl, or N≡N—, $R^1$, $R^2$, $R^3$ and $R^4$ each represent the same or different organic group, a, b, c, and d each represent an integer of 0 to 3, and (a+b+c+d) is equal to the valence of W; M represents a metal or a metalloid constituting the center atom of the halide complex $[ML_{e+f}]$, for example, B, P, As, Sb, Fe, Sn, Bi, Al, Ca, In, Ti, Zn, Sc, V, Cr, Mn, or Co; and L represents a halogen atom, for example, F, Cl, or Br, e represents the net charge of the halide complex ion, and f represents the valence of M)

Specific examples of the anion ($ML_{e+f}$) in the above formula (II) can include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

In addition, onium salts having an anion represented by the formula $[ML_f(OH)^-]$ can also be used. Further, onium salts having other anions, such as a perchlorate ion ($ClO_4^-$), a trifluoromethanesulfonate ion ($CF_3SO_3^-$), a fluorosulfonate ion ($FSO_3^-$), a toluenesulfonate ion, a trinitrobenzenesulfonate anion, and a trinitrotoluenesulfonate anion, may be used. One of these can be used alone, or two or more of these can be used in combination.

Examples of the compounds that generate an active radical species by light irradiation can include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methyl-propan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, 2-benzyl-2-dimethylamino-1-(4-morpholinophenyl)-butanone-1,4-(2-hydroxyethoxy)phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, and oligo(2-hydroxy-2-methyl-1-(4-(1-methylvinyl)phenyl) propanone).

Thermal Polymerization Initiator:

The thermal polymerization initiator refers to a compound that generates a radical by heating. Examples of the thermal polymerization initiator include organic peroxides, persulfates, azo compounds, and redox initiators.

Examples of the above organic peroxides include peroxides such as benzoyl peroxide, cumene hydroperoxide, di-t-butyl peroxide, t-butyl hydroperoxide and dicumyl peroxide, acetyl peroxide, lauroyl peroxide, cyclohexanone peroxide, dibenzoyl peroxide, and tert-butyl permaleate; peroxycarbonates, such as 1,bis(t-butylperoxycarbonyloxy)hexane; and peroxyketals.

Examples of the above persulfates include potassium persulfate, sodium persulfate, and ammonium persulfate.

Examples of the above azo compounds can include 2,2'-azobispropane, 2,2'-dichloro-2,2'-azobispropane, 1,1'-azo (methylethyl)diacetate, 2,2'-azobisisobutane, 2,2'-azobisisobutylamide, 2,2'-azobisisobutyronitrile (AIBN), methyl 2,2'-azobis-2-methylpropionate, 2,2'-dichloro-2,2'-azobisbutane, 2,2'-azobis-2-methylbutyronitrile, dimethyl 2,2'-azobisisobutyrate, 3,5-dihydroxymethylphenylazo-2-methylmalonodinitrile, 2,2'-azobis-2-methylvaleronitrile, dimethyl 4,4'-azobis-4-cyanovalerate, and 2,2'-azobis-2,4-dimethylvaleronitrile.

Examples of the above redox initiators can include combinations such as hydrogen peroxide-iron(II) salt, organized oxide-dimethylaniline, and cerium(IV) salt-alcohol.

The amount of the polymerization initiator used in the present invention is preferably 0.01 to 20% by mass, further preferably 0.1 to 10% by mass, based on the solids of the olefin polymer.

(Optional Components)

1) Metal Compound Particles

In the present invention, metal compound particles may be blended.

Examples of the metal of the metal compound particles include silicon, tungsten, antimony, zirconium, aluminum, titanium, magnesium, iron, tin, zinc, cadmium, nickel, copper, berium, ruthenium, thorium, yttrium, mercury, cesium, chromium, and lanthanum. Examples of the metal compound include metal oxides, such as silica, tungsten oxide, antimony oxide, zirconia, alumina, titania, magnesium oxide, tin oxide, zinc oxide, cadmium oxide, yttrium oxide, nickel oxide, copper oxide, berium oxide, ruthenium oxide, thorium oxide, mercury oxide, cerium oxide, and chromium oxide, and magnesium fluoride.

The metal compound particles are preferably silica and at least one selected from zirconia, alumina, and titania, more preferably a mixed sol of a silica sol and a zirconia sol.

The metal compound particles used are not particularly limited whether they are secondary particles or primary particles. The metal compound particles are preferably primary particles.

The particle diameter of the metal compound is not particularly limited. The average primary particle diameter is preferably in the range of 1 nm to 100 nm, further preferably in the range of 1 nm to 50 nm.

In addition, the properties and state of the metal compound particles may be a sol or a powder, and usually, a sol is preferably used. A sol is usually a colloidal dispersion solution, and therefore, a uniform dispersion solution can be easily made by simply mixing the sol with another component. In addition, the problem of becoming nonuniform due to settling or the like is a little.

In addition, metal compound particles whose surface is surface-modified with a silane coupling agent or the like can be used. Specifically, a silica sol or the like subjected to hydrophobic treatment with hydrocarbon groups or the like can be illustrated.

The amount of the blended metal compound particles in the solids of the organic-inorganic hybrid coating composition of the present invention is 0.1 to 50% by mass, preferably 0.1 to 25% by mass, based on the total mass of the condensate of the organic silicon compound, the olefin polymer, and the metal compound particles.

2) Solvent

The solvent used in the present invention is not particularly limited. Examples of the solvent include water; aromatic hydrocarbons, such as benzene, toluene, and xylene; aliphatic hydrocarbons, such as hexane and octane; alicyclic hydrocarbons, such as cyclohexane and cyclopentane; ketones, such as acetone, methyl ethyl ketone, and cyclohexanone; ethers, such as tetrahydrofuran and dioxane; esters, such as ethyl acetate and butyl acetate; amides, such as N,N-dimethylformamide and N,N-dimethylacetamide; sulfoxides, such as dimethyl sulfoxide; alcohols, such as methanol and ethanol; and polyhydric alcohol derivatives, such as ethylene glycol monomethyl ether and ethylene glycol monomethyl ether acetate. One of these solvents can be used alone, or two or more of these solvents can be used in combination.

3) Other Components that can be Contained

In addition, it is also possible to separately add and disperse a filler in the organic-inorganic hybrid coating composition of the present invention in order to exhibit properties, such as the coloration of the obtained coating layer, layer thickening, the prevention of the transmission of ultraviolet rays to the base, the provision of anticorrosiveness, and heat resistance. However, for oxides, some are described overlapping the above metal oxide particles.

Examples of this filler include water-insoluble pigments, such as organic pigments and inorganic pigments, or particulate, fibrous, or scaly metals and alloys and oxides, hydroxides, carbides, nitrides, and sulfides thereof other than pigments. Specific examples of this filler can include particulate, fibrous, or scaly iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomaceous earth, slaked lime, gypsum, talc, barium carbonate, calcium carbonate, magnesium carbonate, barium sulfate, bentonite, mica, zinc green, chromium green, cobalt green, viridian, guinea green, cobalt chromium green, Scheele's green, green earth, manganese green, pigment green, ultramarine blue, Prussian blue, blue verditer, cobalt blue, cerulean blue, copper borate, molybdenum blue, copper sulfide, cobalt violet, Mars violet, manganese violet, pigment violet, lead suboxide, calcium plumbate, zinc yellow, lead sulfide, chromium yellow, ocher, cadmium yellow, strontium yellow, titanium yellow, litharge, pigment yellow, cuprous oxide, cadmium red, selenium red, chromium vermilion, red oxide, zinc white, antimony white, basic lead sulfate, titanium white, lithopone, lead silicate, zircon oxide, tungsten white, lead flowers of zinc, Bantison white, lead phthalate, manganese white, lead sulfate, graphite, bone black, diamond black, thermatomic black, vegetable black, potassium titanate whiskers, and molybdenum disulfide.

In addition, additives, such as known dehydrators, such as methyl orthoformate, methyl orthoacetate, and tetraethoxysilane, various surfactants, and silane coupling agents, titanium coupling agents, dyes, dispersing agents, thickening agents, and leveling agents other than the above can also be added to the organic-inorganic hybrid coating composition of the present invention.

(Method for Preparing Organic-Inorganic Hybrid Coating Composition)

As a method for preparing the organic-inorganic hybrid coating composition of the present invention, an organic silicon compound and/or a condensate thereof, a silanol condensation catalyst, an olefin-based polymer, a polymerization initiator, and a solvent and other optional components as required are mixed.

Specifically, for example, a silanol condensation catalyst is mixed with a solvent, a predetermined amount of water is added for (partial) hydrolysis, and then, an organic silicon compound is added for (partial) hydrolysis. On the other hand, an olefin polymer and a polymerization initiator are dissolved in a solvent, and then, both solutions are mixed. These components can also be simultaneously mixed. In addition, examples of the method for mixing the organic silicon compound and the silanol condensation catalyst can include a method of mixing the organic silicon compound and the silanol condensation catalyst and then adding water for (partial) hydrolysis, and a method of mixing (partial) hydrolysates obtained by separately (partially) hydrolyzing the organic silicon compound and the silanol condensation catalyst. It is not always necessary to add water or a solvent, but it is preferred to add water to provide a (partial) hydrolysate. Although the amount of the predetermined amount of water depends on the type of the silanol condensation catalyst, for example, when the silanol condensation catalyst is a metal compound having two or more hydroxyl groups or hydrolyzable groups, 0.5 moles or more of water is preferably used, and 0.5 to 2 moles of water is more preferably used, based on 1 mole of the metal compound. In addition, when the silanol condensation catalyst is a metal chelate compound or a metal organic acid salt compound, 5 to 100 moles of water is preferably used, and 5 to 20 moles of water is more preferably used, based on 1 mole of the metal chelate compound or the metal organic acid salt compound.

(Organic-Inorganic Hybrid)

The organic-inorganic hybrid of the present invention comprises:

a) a condensate of an organic silicon compound which is at least one represented by formula (I):

$$R_nSiX_{4-n} \quad (I)$$

(wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different), wherein the solubility parameter of $R_n$ (SP1) obtained by Fedors' estimation method is smaller than the solubility parameter of an olefin-based polymer (SP2) obtained by Fedors' estimation method and the difference between the SP1 and the SP2 is 1.6 or more (Si1);

b) a photopolymerization initiator or a thermal polymerization initiator; and c) a cured product of the olefin-based polymer.

The organic-inorganic hybrid of the present invention encompasses those in which a silanol condensation catalyst (also encompassing a derivative in which the structure of the catalyst is changed) is dispersed in a non-bonded state in a condensate of an organic silicon compound, those in which a silanol condensation catalyst (also encompassing a derivative in which the structure of the catalyst is changed) is bonded to a condensate of an organic silicon compound (for example, those having a Si—O-M bond (M represents a metal atom in a silanol condensation catalyst)), and those consisting of a mixed state thereof.

(Laminate having Organic-Inorganic Hybrid Thin Layer)

Specific examples of the organic-inorganic hybrid of the present invention described above include a molded product molded by casting into a mold, and a thin layer formed by application onto a substrate. In the case of using the thermal polymerization initiator, when a thin layer is formed, the method is not particularly limited as long as it is a method of application onto a substrate followed by drying and/or heating. In the case of using the photopolymerization initiator, light suitable for the initiator should be irradiated after drying. Light including a wavelength of 350 nm or less is preferably irradiated, and thus, a thin layer (organic-inorganic hybrid thin layer) having higher hardness can be obtained. In the present invention, the "light including a wavelength of 350 nm or less" means having not only a wavelength of 350 nm or less but also ultraviolet rays having a wavelength longer than 350 nm.

Examples of substrates on which the thin layer of the present invention can be formed include metals, ceramics, glass, and plastics. Conventionally, the formation of a thin layer on a plastic substrate has been difficult, and the substrates have been limited to inorganic substrates, such as glass. But, the thin layer of the present invention can be easily formed as a coating even on plastic substrates on which it is difficult to form a thin layer, and the thin layer of the present invention is also suitable for plastic optical components. Examples of such plastics include olefin resins, polycarbonate resins, acrylic resins, polyimide resins, polyester resins, epoxy resins, liquid crystal polymer resins, and polyethersulfones. Particularly, olefin resins are preferred, and cycloolefin resins are particularly preferred.

In addition, as a method for applying the organic-inorganic hybrid coating composition, known application methods can be used. Examples of the method can include dipping methods, spraying methods, bar coating methods, roll coating methods, spin coating methods, curtain coating methods, gravure printing methods, silk screen methods, and ink jet methods. In addition, the thickness of the formed layer is not particularly limited, and is, for example, about 0.05 to 200 μm.

The drying treatment of the coating layer formed by applying the organic-inorganic hybrid coating composition using the photopolymerization initiator is, for example, preferably performed at 40 to 200° C. for about 1 to 120 minutes, more preferably at 60 to 120° C. for about 10 to 60 minutes.

The irradiation with light including a wavelength of 350 nm or less can be performed using, for example, a known apparatus, such as a high pressure mercury lamp, a low pressure mercury lamp, a metal halide lamp, or an excimer lamp.

The light for irradiation is preferably light comprising light having any wavelength in the range of 150 to 350 nm as the main component, more preferably light comprising light having any wavelength in the range of 250 to 310 nm as the main component. Organic-inorganic hybrid layers that are sensitive to wavelengths in such a range and do not react to light of more than 350 nm, preferably 310 nm, are hardly affected by sunlight. In addition, the amount of irradiation light of light for irradiation is, for example, about 0.1 to 100 J/cm$^2$, and is preferably about 0.2 to 20 J/cm$^2$, more preferably about 0.5 to 10 J/cm$^2$, considering film curing efficiency (the relationship between irradiation energy and the extent of film curing).

The irradiation with light having a wavelength of 350 nm or less refers to irradiation using a source of light comprising light having any wavelength of 350 nm or less as a component, preferably, irradiation using a source of light comprising light having any wavelength of 350 nm or less as the main component, that is, irradiation using a source of light in which the wavelength of a component in the largest amount is 350 nm or less.

As the heating and drying treatment of the coating layer formed by applying the organic-inorganic hybrid coating composition using the thermal polymerization initiator, the temperature is 10 to 200° C., preferably 10 to 160° C., more preferably 10 to 130° C., and further preferably 20 to 130° C., and the time is 1 minute to 3 hours.

The element concentration in the depth direction of the organic-inorganic hybrid thin layer of the present invention can be measured by ESCA analysis.

According to ESCA analysis, the organic-inorganic hybrid thin layer of the present invention has a layer in which the condensate of the organic silicon compound represented by formula (I) is concentrated, on the thin layer surface side.

The concentration of carbon atoms in a portion in which the concentrated layer is formed is less than the concentration of carbon atoms in a portion of the film at 10 nm from the base material side by 40% or more, preferably 50% or more.

Here, "the concentration of carbon atoms" means the molar concentration of carbon atoms when (all metal atoms+oxygen atoms+carbon atoms) is 100%. The same applies to the concentration of other elements.

In addition, the "layer in which the condensate of the organic silicon compound is concentrated" is defined by the concentration of carbon atoms by ESCA analysis, and in the "layer in which the condensate of the organic silicon compound is concentrated," the silicon concentration is high.

In the present invention, the relationship is such that the lower the carbon concentration is, the higher the silicon concentration is.

EXAMPLES

The present invention will be more specifically described below by Examples, but the technical scope of the present invention is not limited to these illustrations.

In the following Examples, MIBK means methyl isobutyl ketone.

Example 1

1) Preparation of Condensate of Organic Silicon Compound

A 140 mL mayonnaise bottle was charged with 17.00 g of methyltrimethoxysilane (Shin-Etsu Chemical Co., Ltd. KBM-13). 3.02 g of titanium diisopropoxybisacetylacetonate (Nippon Soda Co., Ltd., T-50, the amount of solids in terms of TiO$_2$: 16.5 wt %) was added so as to be 5 mol % in terms of TiO$_2$ based on the methyltrimethoxysilane. Then, 19.91 g of MIBK was charged, and the mixture was stirred at a stirring speed of 100 rpm for 15 minutes. 4.50 g of distilled water was charged so as to be 2 times mol based on the methyltrimethoxysilane, and a hydrolysis reaction was performed for 2 hours while the mixture was stirred at a stirring speed of 100 rpm. At this time, the solution temperature increased to 40° C. After the completion of the reaction, the reaction solution was allowed to stand for 30 minutes until the solution temperature of the reaction solution reached 25° C., to prepare a condensate of an organic silicon compound.

2) Preparation of Organic-Inorganic Hybrid Coating Composition 17.37 g of polybutadiene and 9.65 g of the above condensate of the organic silicon compound were mixed so that the polybutadiene (manufactured by Nippon Soda Co., Ltd., G-3000, SP value: about 8.5)/the condensate of the organic silicon compound was 90 wt %/10 wt %, and the mixture was diluted with 2.29 g of MIBK. Then, 0.69 g of dicumyl peroxide (thermal polymerization initiator: manufactured by NOF CORPORATION, PERCUMYL D) was added so as to be 4 wt % based on the solids of the polybutadiene, to prepare an organic-inorganic hybrid coating composition having 40 wt % solids.

3) Making of Organic-Inorganic Hybrid Thin Layer

The organic-inorganic hybrid coating composition prepared as described above was formed into a film on a stainless plate by bar coating so as to be 5 μm, and dried at 150° C. by a warm air circulation type dryer for 30 minutes to make an organic-inorganic hybrid thin layer.

Figure 1:
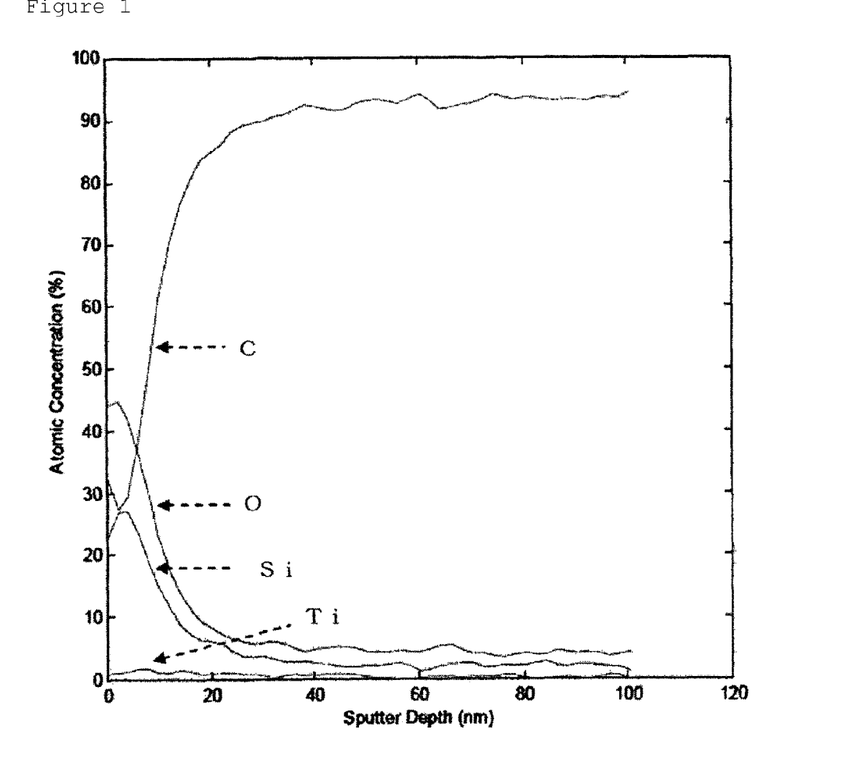
FIG. 1 is a diagram showing, for the organic-inorganic hybrid thin layer of Example 1, the distribution of each element in the layer thickness direction measured by ESCA.

The concentration of each element in the layer thickness direction was measured by ESCA (FIG. 1).

Example 2

1) Preparation of Condensate of Organic Silicon Compound

A 140 mL mayonnaise bottle was charged with 17.00 g of methyltrimethoxysilane (Shin-Etsu Chemical Co., Ltd. KBM-13). 3.02 g of titanium diisopropoxybisacetylacetonate (Nippon Soda Co., Ltd., T-50, the amount of solids in terms of TiO$_2$: 16.5 wt %) was added so as to be 5 mol % in terms of TiO$_2$ based on the methyltrimethoxysilane. 19.91 g of MIBK was charged, and the mixture was stirred (stirring speed: 100 rpm) for 15 minutes.

4.50 g of distilled water was charged so as to be 2 times mol based on the methyltrimethoxysilane, and a hydrolysis reaction was performed (2 hours, stirring speed: 100 rpm). At this time, the solution temperature increased to 40° C. After the completion of the reaction, the reaction solution was allowed to stand for 30 minutes until the solution temperature of the reaction solution reached 25° C., to prepare a condensate of an organic silicon compound.

2) Preparation of Organic-Inorganic Hybrid Coating Composition 17.37 g of EA-3000 and 9.65 g of the condensate of the organic silicon compound were mixed so as to be polybutadiene (Nippon Soda Co., Ltd., EA-3000, SP value: 8.5)/the condensate of the organic silicon compound=90 wt %/10 wt %, and then, the mixture was diluted with 22.29 g of MIBK. 0.69 g of Irgacure 907 (photopolymerization initiator: registered trademark, Ciba Specialty Chemicals polymerization initiator) was added so as to be 4 wt % based on the solids of EA-3000. An organic-inorganic hybrid coating composition having 40 wt % solids was prepared.

3) Making of Organic-Inorganic Hybrid Thin Layer

A layer was formed on ZEONOR Film ZF-16 (188 μm) manufactured by ZEON Corporation by bar coating so as to be 5 μm, and dried at 80° C. by a warm air circulation type dryer for 3 minutes. Then, the layer was irradiated with ultraviolet rays in an accumulated amount of irradiation of 400 mJ/cm$^2$ by a condensing type high pressure mercury lamp (UV light comprising light having wavelengths of 365 nm, 313 nm, and 254 nm as the main component, manufactured by EYE GRAPHICS CO., LTD., 120 W/cm, lamp height: 9.8 cm, conveyor speed: 5 m/min) to obtain a thin layer.

Figure 2:
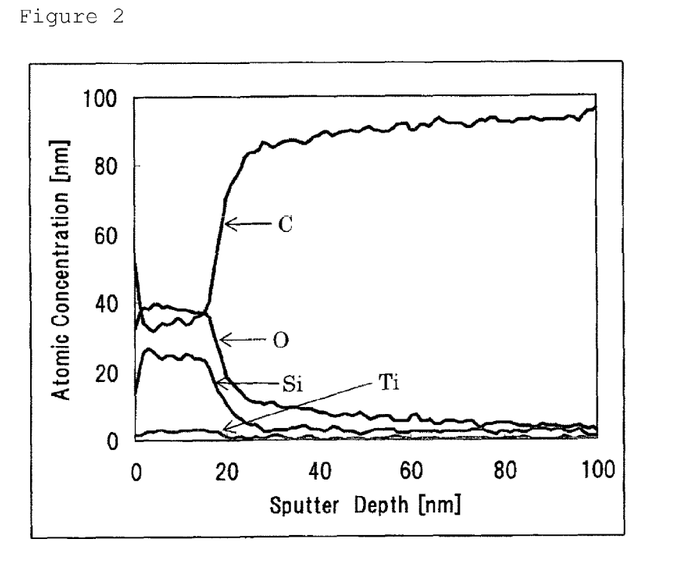
FIG. 2 is a diagram showing, for the organic-inorganic hybrid thin layer of Example 2, the distribution of each element in the layer thickness direction of the thin layer measured by ESCA.

The concentration of each element in the layer thickness direction of the thin layer was measured by ESCA. The results are shown in FIG. 2.

Example 3

1) Preparation of Condensate of Organic Silicon Compound

A 140 mL mayonnaise bottle was charged with 17.00 g of methyltrimethoxysilane (Shin-Etsu Chemical Co., Ltd. KBM-13). 3.02 g of titanium diisopropoxybisacetylacetonate (Nippon Soda Co., Ltd., T-50, the amount of solids in terms of TiO$_2$: 16.5 wt %) was added so as to be 5 mol % in terms of TiO$_2$ based on the methyltrimethoxysilane. 19.91 g of MIBK was charged, and the mixture was stirred (stirring speed: 100 rpm) for 15 minutes.

4.50 g of distilled water was charged so as to be 2 times mol based on the methyltrimethoxysilane, and a hydrolysis reaction was performed (2 hours, stirring speed: 100 rpm). At this time, the solution temperature increased to 40° C. After the completion of the reaction, the reaction solution was allowed to stand for 30 minutes until the solution temperature of the reaction solution reached 25° C., to prepare a condensate of an organic silicon compound.

2) Preparation of Organic-Inorganic Hybrid Coating Composition 17.37 g of G-1000 and 9.65 g of the polysiloxane were mixed so as to be G-1000 (Nippon Soda Co., Ltd., polybutadiene, SP value: about 8.3)/the condensate of the organic silicon compound=90 wt %/10 wt %, and then, the mixture was diluted with 22.29 g of MIBK. Then, 0.69.48 g of dicumyl peroxide (thermal polymerization initiator: manufactured by NOF CORPORATION, PERCUMYL D) was added so as to be 4 wt % based on the solids of the polybutadiene, to prepare an organic-inorganic hybrid coating composition having 40 wt % solids.

3) Organic-Inorganic Hybrid Thin Layer Formation

A film was formed on ZEONOR Film ZF-16 (188 μm) manufactured by ZEON Corporation by bar coating so as to be 5 μm, and heated at 130° C. by a warm air circulation type dryer for 1 hour to make an organic-inorganic hybrid thin layer.

Figure 3:
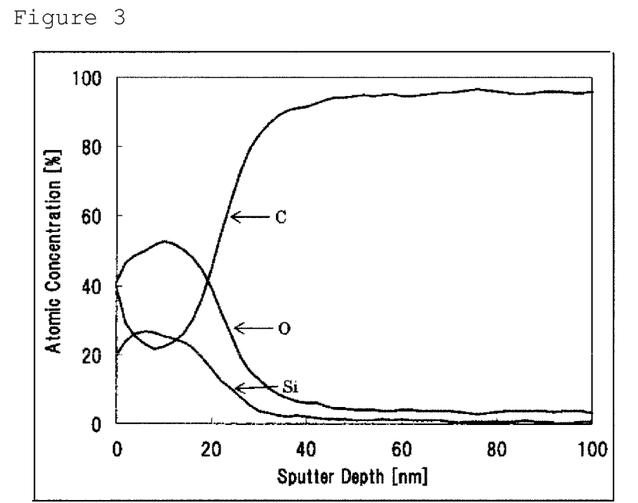
FIG. 3 is a diagram showing, for the organic-inorganic hybrid thin layer of Example 3, the distribution of each element in the layer thickness direction measured by ESCA.

The concentration of each element in the layer thickness direction was measured by ESCA (FIG. 3).

Comparative Example 1

(The Difference in SP Value between Vinyltrimethoxysilane and EA-3000 is less than 1.6)

1) Preparation of Condensate of Organic Silicon Compound

A 140 mL mayonnaise bottle was charged with 17.81 g of vinyltrimethoxysilane (Shin-Etsu Chemical Co., Ltd. KBM-1003). 2.91 g of titanium diisopropoxybisacetylacetonate (Nippon Soda Co., Ltd., T-50, the amount of solids in terms of TiO$_2$: 16.5 wt %) was added so as to be 5 mol % in terms of TiO$_2$ based on the vinyltrimethoxysilane. 26.03 g of MIBK was charged, and the mixture was stirred (stirring speed: 100 rpm) for 15 minutes.

3.25 g of distilled water was charged so as to be 1.5 times mol based on the vinyltrimethoxysilane, and a hydrolysis reaction was performed (2 hours, stirring speed: 100 rpm). At this time, the solution temperature increased to 40° C. After the completion of the reaction, the reaction solution was allowed to stand for 30 minutes until the solution temperature of the reaction solution reached 25° C.

2) Preparation of Organic-Inorganic Hybrid Coating Composition 17.37 g of EA-3000 and 9.65 g of the condensate of the organic silicon compound were mixed so as to be EA-3000 (Nippon Soda Co., Ltd., polybutadiene, SP value: 8.5)/the condensate of the organic silicon compound=90 wt %/10 wt %, and then, the mixture was diluted with 22.29 g of MIBK.

0.69 g of Irgacure 907 (registered trademark, Ciba Specialty Chemicals polymerization initiator) was added so as to be 4 wt % based on the solids of EA-3000. A coating agent having 40 wt % solids was obtained.

3) Making of Organic-Inorganic Hybrid Thin Layer

A layer was formed on ZEONOR Film ZF-16 (188 μm) manufactured by ZEON Corporation by bar coating so as to be 5 μm, and dried at 80° C. by a warm air circulation type dryer for 3 minutes. Then, the layer was irradiated with ultraviolet rays in an accumulated amount of irradiation of 400 mJ/cm$^2$ by a condensing type high pressure mercury lamp (UV light comprising light having wavelengths of 365 nm, 313 nm, and 254 nm as the main component, manufactured by EYE GRAPHICS CO., LTD., 120 W/cm, lamp height: 9.8 cm, conveyor speed: 5 m/min) to obtain a thin film.

Figure 4:
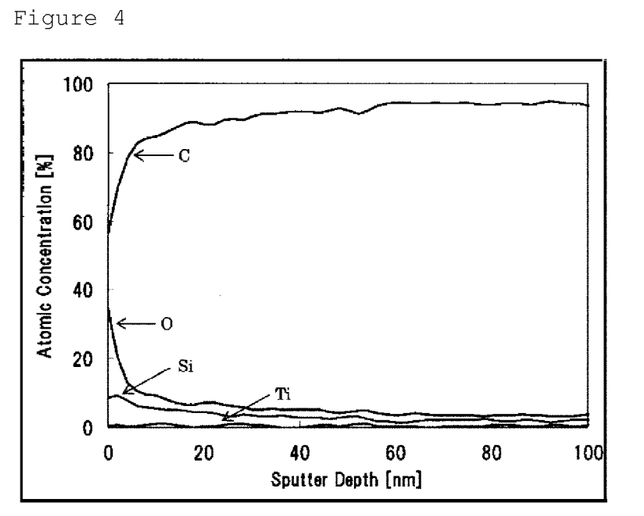
FIG. 4 is a diagram showing, for the organic-inorganic hybrid thin layer of Comparative Example 1, the distribution of each element in the layer thickness direction measured by ESCA.

The concentration of each element in the layer thickness direction was measured by ESCA (FIG. 4).

The invention claimed is:

1. An organic-inorganic hybrid coating composition comprising:
   a) a condensate of an organic silicon compound which is at least one represented by formula (I):

$$R_nSiX_{4-n} \quad (I)$$

wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different, wherein a solubility parameter of R$_n$ obtained by a Fedors' estimation method (SP1) is smaller than a solubility parameter of a nonconjugated diene-based polymer or a conjugated diene-based polymer by the Fedors' estimation method (SP2) and a difference between the SP1 and the SP2 is 1.6 or more;
   b) a photopolymerization initiator or a thermal polymerization initiator; and
   c) the nonconjugated diene-based polymer or the conjugated diene-based polymer in which the polymer ends are not modified with an acrylic group; and
   d) at least one photosensitive compound sensitive to light having a wavelength of 350 nm or less selected from the group consisting of metal chelate compounds, organic acid metal salts, metal compounds having two or more hydroxyl groups or hydrolyzable groups, hydrolysates thereof, and condensates thereof.

2. An organic-inorganic hybrid coating composition comprising:
   a) a condensate of an organic silicon compound which is at least one represented by formula (I):

$$R_nSiX_{4-n} \quad (I)$$

wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different,
wherein the organic silicon compound is
an organic silicon compound (Si1) in which a solubility parameter of $R_n$ obtained by a Fedors' estimation method (SP1) is smaller than a solubility parameter of a nonconjugated diene-based polymer or a conjugated diene-based polymer obtained by the Fedors' estimation method (SP2) and a difference between the SP1 and the SP2 is 1.6 or more, or
a mixture of an organic silicon compound (Si1) in which a solubility parameter of $R_n$ obtained by a Fedors' estimation method (SP1) is smaller than a solubility parameter of a nonconjugated diene-based polymer or a conjugated diene-based polymer obtained by the Fedors' estimation method (SP2) and a difference between the SP1 and the SP2 is 1.6 or more and an organic silicon compound (Si2) in which the SP1 of Si2 is smaller than the SP2 and a difference between the SP1 of Si2 and the SP2 is less than 1.6 or an organic silicon compound (Si2) in which the SP1 of Si2 is larger than the SP2
wherein a molar ratio of organic silicon compounds Si1 and Si2 (Si1:Si2) is 5:5 to 10:0,
b) a photopolymerization initiator or a thermal polymerization initiator;
c) the nonconjugated diene-based polymer or the conjugated diene-based polymer in which the polymer ends are not modified with an acrylic group; and
d) at least one photosensitive compound sensitive to light having a wavelength of 350 nm or less selected from the group consisting of metal chelate compounds, organic acid metal salts, metal compounds having two or more hydroxyl groups or hydrolyzable groups, hydrolysates thereof, and condensates thereof.

3. An organic-inorganic hybrid comprising:
a) a condensate of an organic silicon compound which is at least one represented by formula (I):

$$R_nSiX_{4-n} \quad (I)$$

wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different, wherein a solubility parameter of $R_n$ obtained by a Fedors' estimation method (SP1) is smaller than a solubility parameter of a nonconjugated diene-based polymer or a conjugated diene-based polymer obtained by the Fedors' estimation method (SP2) and a difference between the SP1 and the SP2 is 1.6 or more;
b) a photopolymerization initiator or a thermal polymerization initiator; and
c) a cured product of the nonconjugated diene-based polymer or the conjugated diene-based polymer in which the polymer ends are not modified with an acrylic group; and
d) at least one photosensitive compound sensitive to light having a wavelength of 350 nm or less selected from the group consisting of metal chelate compounds, organic acid metal salts, metal compounds having two or more hydroxyl groups or hydrolyzable groups, hydrolysates thereof, and condensates thereof.

4. An organic-inorganic hybrid comprising:
a) a condensate of an organic silicon compound which is at least one represented by formula (I):

$$R_nSiX_{4-n} \quad (I)$$

wherein R represents an organic group having a carbon atom directly bonded to Si, and X represents a hydroxyl group or a hydrolyzable group; and n represents 1 or 2, wherein when n is 2, each R is the same or different, and when (4-n) is 2 or more, each X is the same or different,
wherein the organic silicon compound is
an oranic silicon comound Si1 in which a solubilit arameter of $R_n$ obtained by a Fedors' estimation method (SP1) is smaller than a solubility parameter of a nonconjugated diene-based polymer or a conjugated diene-based polymer obtained by the Fedors' estimation method (SP2) and a difference between the SP1 and the SP2 is 1.6 or more, or
a mixture of an organic silicon compound (Si1) in which a solubility parameter of $R_n$ obtained by a Fedors' estimation method (SP1) is smaller than a solubility parameter of a nonconjugated diene-based polymer or a conjugated diene-based polymer obtained by the Fedors' estimation method (SP2) and a difference between the SP1 and the SP2 is 1.6 or more and an organic silicon compound (Si2) in which the SP1 of Si2 is smaller than the SP2 and a difference between the SP1 of Si2 and the SP2 is less than 1.6 or an organic silicon compound (Si2) in which the SP1 of Si2 is larger than the SP2;
wherein a molar ratio of organic silicon compounds Si1 and Si2 (Si1:Si2) is 5:5 to 10:0,
b) a photopolymerization initiator or a thermal polymerization initiator; and
c) a cured product of the nonconjugated diene-based polymer or the conjugated diene-based polymer in which the polymer ends are not modified with an acrylic group; and
d) at least one photosensitive compound sensitive to light having a wavelength of 350 nm or less selected from the group consisting of metal chelate compounds, organic acid metal salts, metal compounds having two or more hydroxyl groups or hydrolyzable groups, hydrolysates thereof, and condensates thereof.

5. A laminate obtained by applying an organic-inorganic hybrid coating composition according to claim 1 to a substrate.

6. A laminate obtained by applying an organic-inorganic hybrid coating composition according to claim 2 to a substrate.

* * * * *